(12) United States Patent
Claassen et al.

(10) Patent No.: US 12,317,139 B2
(45) Date of Patent: *May 27, 2025

(54) SEAMLESS RELOCATION OF A MOBILE TERMINAL IN A WIRELESS NETWORK

(71) Applicant: SMARTSKY NETWORKS LLC, Morrisville, NC (US)

(72) Inventors: David Aaron Claassen, Leesburg, VA (US); Lei Wang, Oak Hill, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,477

(22) Filed: Jan. 29, 2024

(65) Prior Publication Data

US 2024/0334283 A1 Oct. 3, 2024

Related U.S. Application Data

(63) Continuation of application No. 17/683,758, filed on Mar. 1, 2022, now Pat. No. 11,889,371, which is a
(Continued)

(51) Int. Cl.
*H04W 36/00* (2009.01)
*H04W 36/14* (2009.01)

(52) U.S. Cl.
CPC ....... *H04W 36/0016* (2013.01); *H04W 36/14* (2013.01); *H04W 36/142* (2023.05)

(58) Field of Classification Search
CPC .......................... H04W 36/14; H04W 36/0016
See application file for complete search history.

(56) References Cited

U.S. PATENT DOCUMENTS 9,490,951 B2 * 11/2016 Seo ........................ H04L 5/0091
9,749,074 B2 * 8/2017 Ji ............................ H04J 11/005
(Continued)

FOREIGN PATENT DOCUMENTS

CN          101588325 A    11/2009
CN          102316543 A     1/2012
(Continued)

OTHER PUBLICATIONS

"Use Case and Requirements for Broadband Direct Air to Ground Communications," 3rd Generation Partnership Project, Oct. 2015, all enclosed pages cited.
(Continued)

*Primary Examiner* — Michael J Moore, Jr.
(74) *Attorney, Agent, or Firm* — Burr & Forman LLP (57) ABSTRACT

A method for performing seamless relocation of a mobile terminal in a wireless network includes selecting a first serving gateway (SGW) among a plurality of SGWs and a first packet data network gateway (PGW) among a plurality of PGWs, wherein the first SGW connects to the first PGW to setup the first S5 session, establishing a first communication channel between the terminal and the first PGW and assigning an internet protocol (IP) address to the terminal, selecting a second SGW among the plurality of SGWs when the terminal is about to move out of an area being served by the first SGW, connecting the second SGW to the second PGW to setup a new S5 session when a second PGW among the plurality of PGWs is closer to the second SGW than the first PGW or connecting the second SGW to the first PGW to modify the first S5 session when no PGW is closer to the second SGW than the first PGW, establishing a second communication channel between the terminal and the second SGW using the IP address allocated to the terminal, reconfiguring routing for terminal IP destination, and termi-
(Continued)

nating the first communication channel between the terminal and the first PGW.

20 Claims, 8 Drawing Sheets

Related U.S. Application Data continuation of application No. 16/721,042, filed on Dec. 19, 2019, now Pat. No. 11,297,552, which is a continuation of application No. 15/883,303, filed on Jan. 30, 2018, now Pat. No. 10,548,059, which is a continuation of application No. 15/018,278, filed on Feb. 8, 2016, now Pat. No. 9,924,431.

(56) References Cited

U.S. PATENT DOCUMENTS

| | | | | |
|---|---|---|---|---|
| 9,924,431 | B2* | 3/2018 | Claassen | H04W 36/142 |
| 10,548,059 | B2* | 1/2020 | Claassen | H04W 36/0016 |
| 11,297,552 | B2* | 4/2022 | Claassen | H04W 36/142 |
| 11,889,371 | B2* | 1/2024 | Claassen | H04W 36/0016 |
| 2011/0051683 | A1* | 3/2011 | Ramankutty | H04W 36/0033 |
| | | | | 370/331 |
| 2011/0075675 | A1 | 3/2011 | Koodli et al. | |
| 2011/0200007 | A1* | 8/2011 | Qiang | H04W 60/00 |
| | | | | 370/331 |
| 2011/0286430 | A1* | 11/2011 | Zembutsu | H04W 36/326 |
| | | | | 370/331 |
| 2013/0242890 | A1* | 9/2013 | He | H04W 72/21 |
| | | | | 370/329 |
| 2013/0242947 | A1* | 9/2013 | Chen | H04L 1/0061 |
| | | | | 370/335 |
| 2013/0250882 | A1* | 9/2013 | Dinan | H04L 5/0032 |
| | | | | 370/329 |
| 2013/0301562 | A1* | 11/2013 | Liao | H04W 72/23 |
| | | | | 370/329 |
| 2014/0036776 | A1* | 2/2014 | Al-Shalash | H04W 36/0033 |
| | | | | 370/328 |
| 2014/0036810 | A1* | 2/2014 | Harrison | H04L 5/0053 |
| | | | | 370/329 |
| 2014/0071934 | A1* | 3/2014 | Frenne | H04W 72/0453 |
| | | | | 370/329 |
| 2014/0092772 | A1* | 4/2014 | Bitar | H04W 8/26 |
| | | | | 370/254 |
| 2014/0177540 | A1* | 6/2014 | Novak | H04L 1/1861 |
| | | | | 370/329 |
| 2014/0348130 | A1* | 11/2014 | Kaippallimalil | H04W 76/12 |
| | | | | 370/331 |
| 2015/0063346 | A1* | 3/2015 | Eswara | H04L 65/1043 |
| | | | | 370/352 |
| 2015/0106454 | A1 | 4/2015 | Lim et al. | |
| 2015/0223133 | A1* | 8/2015 | Stojanovski | H04W 72/20 |
| | | | | 370/230 |
| 2016/0100330 | A1 | 4/2016 | Broustis et al. | |
| 2016/0142944 | A1* | 5/2016 | Cao | H04W 36/0022 |
| | | | | 455/436 |
| 2016/0295476 | A1 | 10/2016 | Bi et al. | |
| 2016/0330077 | A1 | 11/2016 | Jin et al. | |
| 2016/0337454 | A1 | 11/2016 | Hoffmann | |
| 2016/0353325 | A1 | 12/2016 | Poikonen | |
| 2016/0360458 | A1* | 12/2016 | Lubenski | H04W 36/0019 |
| 2017/0093749 | A1 | 3/2017 | Hoffmann | |
| 2017/0156086 | A1* | 6/2017 | Tomici | H04W 8/26 |
| 2017/0251405 | A1* | 8/2017 | Stojanovski | H04W 8/082 |
| 2017/0265057 | A1* | 9/2017 | Zhang | H04W 60/04 |
| 2018/0152857 | A1* | 5/2018 | Johansson | H04W 52/0203 |
| 2018/0242318 | A1* | 8/2018 | Christensson | H04W 72/52 |
| 2018/0262424 | A1* | 9/2018 | Roeland | H04L 45/64 |
| 2018/0279177 | A1* | 9/2018 | Hurd | H04W 28/16 |
| 2018/0288657 | A1* | 10/2018 | Stojanovski | H04W 36/1443 |
| 2018/0332590 | A1* | 11/2018 | Johansson | H04W 72/044 |
| 2019/0082362 | A1* | 3/2019 | Xu | H04W 76/30 |
| 2020/0128462 | A1* | 4/2020 | Claassen | H04W 36/142 |

FOREIGN PATENT DOCUMENTS

| | | | | |
|---|---|---|---|---|
| CN | 102523629 A | | 6/2012 | |
| CN | 105264918 A | | 1/2016 | |
| EP | 2648466 A1 | * | 10/2013 | H04L 41/0668 |
| WO | 2014190197 A1 | | 11/2014 | |
| WO | 2015096794 A1 | | 7/2015 | |

OTHER PUBLICATIONS

"Architecture Enhancements for non-3GPP accesses," 3rd Generation Partnership Project, Dec. 2015 all enclosed pages cited.
International Search Report and Written Opinion of PCT/US2017/016140 mailed May 4, 2017, all enclosed pages cited.
Examination report from corresponding Australian application No. 2017216956 mailed Aug. 3, 2018, all enclosed pages cited.
Office Action from corresponding Chinese application No. 201780009242.9 mailed Jan. 2, 2019, all enclosed pages cited.
Examination report of corresponding Chinese application No. 201780009242.9 mailed Apr. 16, 2019, all enclosed pages cited.
Examination report of corresponding European application No. 17704948.3 mailed May 16, 2019, all enclosed pages cited.
Office Action in related CN application No. 201780009242.9 issued by the CNIPA on Mar. 13, 2020, all pages cited in its entirety.
Office Action in related CN application No. 201780009242.9 issued by the CNIPA on Jun. 11, 2020, all pages enclosed in its entirety.
The First Examination Report, dated Apr. 29, 2020 in related IN application No. 201817027649, all pages cited in its entirety.

* cited by examiner

SEAMLESS RELOCATION OF A MOBILE TERMINAL IN A WIRELESS NETWORK

CROSS REFERENCE TO RELATED APPLICATION

This application is a continuation of U.S. application Ser. No. 17/683,758 filed Mar. 1, 2022, which is a continuation of U.S. application Ser. No. 16/721,042 filed on Dec. 19, 2019 (which issued Apr. 5, 2022 as U.S. Pat. No. 11,297,552), which is a continuation of U.S. application Ser. No. 15/883,303 filed Jan. 30, 2018 (which issued Jan. 28, 2020 as U.S. Pat. No. 10,548,059), which is a continuation of U.S. application Ser. No. 15/018,278 filed Feb. 8, 2016 (which issued Mar. 20, 2018 as U.S. Pat. No. 9,924,431), the entire contents of which are hereby incorporated by reference in its entirety.

TECHNICAL FIELD

Example embodiments generally relate to wireless communications and, more particularly, relate to a method for relocating a terminal seamlessly to a different packet data network gateway (PGW) in a wireless network.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Networks will undoubtedly be built to provide passengers with connectivity in the air that is similar to the connectivity they enjoy on the ground. However, building an air to ground (ATG) network necessarily means that some unique problems will be encountered that are simply not an issue for conventional terrestrial networks. For example, in terrestrial 3GPP standard networks, at the time a terminal attaches to a network, it will select a serving cell based on the best available base station. A specific serving gateway (SGW) is assigned, generally based on network topology. The SGW connects to a packet data network gateway (PGW) and the terminal becomes "homed" and "anchored" to the assigned PGW. All user data originating from the terminal or destined for the terminal are transmitted through the assigned PGW for as long as the terminal remains attached to the network. The IP address of the terminal is associated with that PGW until the terminal detaches from the network.

As the terminal travels across the network, it may handover between different cells generally based on signal strength. The cell site handover may also trigger a handover to a different SGW when the terminal moves out of current SGW service area. However, the PGW to which the terminal is "homed" and "anchored" does not change. As a result, end-user data from the terminal to the Internet always departs the network through the "home" PGW and data destined for the end user always knows how to "find" the terminal through the terminal's association with the PGW. This works fine for the typical terrestrial network user, who generally stays in a relatively small geographic area. However, when the terminal travels across great geographic distances, the data between the terminal and the assigned PGW will be transmitted back and forth over a long distance, which introduces round-trip latency with potential negative impact on user-experience. Meanwhile, if the terminal should attempt to change its "homed" PGW and get a new IP address during the process, all established connections based on source and destination IP addresses between the terminal and its service providers will be disconnected.

BRIEF SUMMARY OF SOME EXAMPLES

Accordingly, some example embodiments may enable seamless relocation of a terminal to another PGW while maintaining the IP address of the terminal. In one example embodiment, a method for performing seamless relocation of a mobile terminal in a wireless network is provided including selecting a first serving gateway (SGW) among a plurality of SGWs and a first packet data network gateway (PGW) among a plurality of PGWs, wherein the first SGW connects to the first PGW to setup the first S5 session, establishing a first communication channel between the terminal and the first PGW and assigning an internet protocol (IP) address to the terminal, selecting a second SGW among the plurality of SGWs when the terminal is about to move out of an area being served by the first SGW, connecting the second SGW to a second PGW to setup a new S5 session when the second PGW among the plurality of PGWs is closer to the second SGW than the first PGW or connecting the second SGW to the first PGW to modify the first S5 session when no PGW is closer to the second SGW than the first PGW, establishing a second communication channel between the terminal and the second PGW and maintaining the IP address assigned to the terminal previously, reconfiguring routing for terminal IP destination, and terminating the first communication channel between the terminal and the first PGW.

The method further includes dynamically configuring routing, by a software defined networking (SDN) controller, the IP destination for the terminal through the first PGW, when the first communication channel is established, and reconfiguring routing, by the SDN controller, the IP destination for the terminal through the second PGW when the second communication channel is established.

The method may, in some cases, further include attaching a first default bearer to the first communication channel when the first communication channel is established between the UE and the first PGW and attaching a dedicated bearer to a communication channel in addition to a default bearer attached to the communication channel when an additional service is required to satisfy a quality of service (QOS) requirement.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6, which is defined by FIGS. 6A and 6B, illustrates an exemplary visual representation of sequences of events and data flows among the entities of the wireless network according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The term "terminal" as used herein may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or the other terms. Various embodiments of the terminal may include a cellular phone, a smart phone having a wireless communication function, a personal digital assistant (PDA) having a wireless communication function, a wireless modem, a portable computer having a wireless communication function, a capturing device such as a digital camera having wireless communication function, a game device having a wireless communication function, a music storage and replay appliance having a wireless communication function, an Internet appliance enabling wireless Internet access and browsing, and terminals or a portable unit having combinations of the functions, but example embodiments of the present invention are not limited thereto.

The term "base station" as used herein shall be interpreted to mean a fixed part for communicating with terminals in a wireless network. The base station may indicate the collective name for a node-B, an eNode-B, a base transceiver system, an access point, etc. The base station may exchange signaling data with a Mobility Management Entity (MME) and signaling and end-user (bearer) data with the Serving Gateway (SGW).

The term "Mobility Management Entity (MME)" as used herein shall be interpreted to mean a primary control function for the LTE access network. The MME serves multiple SGWs and is responsible for selecting the appropriate PGW when a terminal initially attaches to a network. The MME is also responsible for selecting a best SGW when the terminal attaches and also during a handover of the terminal to a different cell.

The term "Serving Gateway (SGW)" as used herein serves multiple base stations. It terminates the interface towards the E-UTRAN. There is only every one SGW associated with any terminal at any given point in time. At the time a terminal attaches to the network and during handover events, the MME assigns the best SGW (generally based on network topology) to support that terminal. The SGW functions as the user-plane anchor point for inter-stations handover. The SGW routes end-user (bearer) data to the PGW over the S5 interface.

The term "Packet Data Network Gateway (PGW)" as used herein shall be interpreted to mean a terminating interface towards the E-UTRAN. The PGW terminates the SGi interface towards an external packet data networks (PDNs). It provides connectivity between a terminal and external PDNs by providing a single point of entrance and exit for traffic destined for or originating from the terminal. The PGW is selected by the MME at the time that the terminal attaches to the network. The terminal remains anchored to the assigned PGW until it detaches from the network or its Default Bearer is dropped. The PGW also may be responsible for terminal IP address allocation among its other functional responsibilities.

The term "Home Subscriber Server (HSS)" as used herein shall be interpreted to mean a central database that contains all user-related data and related communication channel information. The HSS supports terminal authentication and access authorization, session establishment and mobility management. IP address assignment may be performed by the HSS.

The terms "Software Defined Network (SDN) Controller" and "agent" as used herein shall be interpreted to mean the functional elements, logic, processing, protocols and interfaces to provide flow control and dynamic network configuration, reconfiguration and optimization according to changing needs of the network and transported traffic (as may be determined by traffic volume and flow or performance optimization for example).

The term "S5/S8 Interface" as used herein shall be interpreted to mean a primary interface between the SGW and PGW. (S5 and S8 may be functionally identical; however S8 supports roaming between two/multiple carriers and is not relevant to this paper.) The S5 interface provides user plane tunneling and tunnel management between the SGW and PGW. The S5 interface enables the SGW to connect with multiple PGWs in order to provide different IP services to the UE (for example a non-collocated PGW for required PDN connectivity). It also enables SGW re-location resulting from mobility of a terminal (for example, a handover of the terminal to an eNB supported by a different SGW).

With respect to the term "Bearer-Default Bearer and Dedicated Bearer" as used herein, in LTE standards, bearers carry all data and signaling traffic. Default Bearers are assigned to a terminal when the terminal attaches to the network. The Default Bearer is assigned an IP address and remains associated with the terminal for as long as the terminal is attached to the network. All signaling and data traffic employs the Default Bearer. Where a special handling beyond the scope of the Default Bearer (usually associated with Quality of Service (QOS) is required, for example Voice over LTE (VOLTE), certain video streaming, etc.) a Dedicated Bearer will be assigned to the terminal. The Dedicated Bearer employs the same IP address as the Default Bearer (the Dedicated Bearer basically piggy backs on the Default Bearer) but provides the specific QoS requirements of the protocol being employed. The Dedicated Bearer is terminated when the special needs IP session ends.

Figure 1:
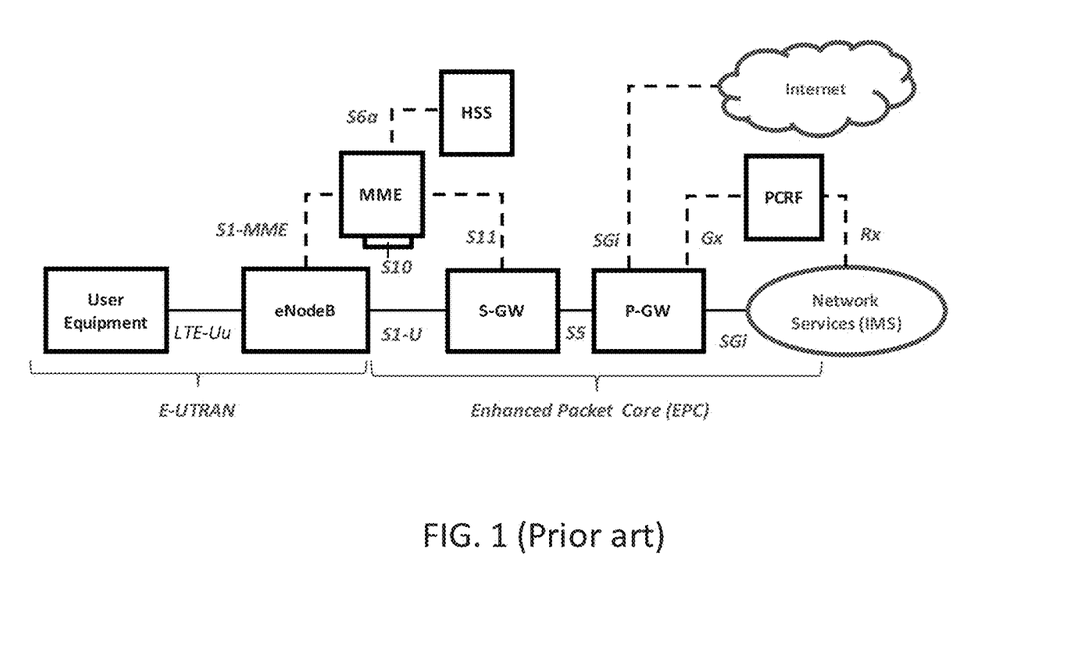
FIG. 1 illustrates a functional architecture of the current 3GPP standards.

FIG. 1 illustrates a functional architecture of the current 3GPP standards. Referring to FIG. 1, the diagram provides a high-level overview of the functionality relevant to example embodiments and as defined by 3GPP Enhanced Packet Core (EPC) standards. The diagram shows a functional overview of the 3GPP LTE E-UTRAN (Evolved Universal Terrestrial Radio Access Networking) making up the radio components of the LTE standards and the EPC, which are the signaling and data functional components of the LTE standards. The diagram also identifies the specific inter-functionality interfaces.

At the time a terminal attaches to the network it will select a serving cell according to a best available base station. During the attachment process, the MME will assign a specific SGW to the terminal. This selection is generally based on network topology in that typically a specific set of eNBs are topologically associated with and supported by the specific SGW. The MME also assigns a PGW to the terminal. The terminal becomes "homed" and "anchored" to the assigned PGW. Traffic is tunneled between the SGW and the PGW by means of the S5 interface. All user data originating from the terminal or destined for the terminal will exit or enter the network through the assigned PGW for as long as the terminal remains attached to the network. The IP address of the terminal is associated with that PGW until the terminal detaches from the network.

As the terminal travels across the network it may handover between different base stations generally based on signal strength. If the terminal desires to handover to a base station no longer supported by the initially assigned SGW, then SGW re-location is orchestrated by the MME and a new SGW is assigned to the terminal. While the SGW is changed, the PGW to which the terminal is "homed" and "anchored" does not change. As a result the S5 interface implements a re-location and user data is tunneled between the newly assigned SGW and the same PGW to which the terminal is anchored. As a result, data transmitting from the network always depart from the assigned PGW and the data destined for the terminal knows how to "find" the terminal because of its association with the specific assigned PGW.

Figure 2:
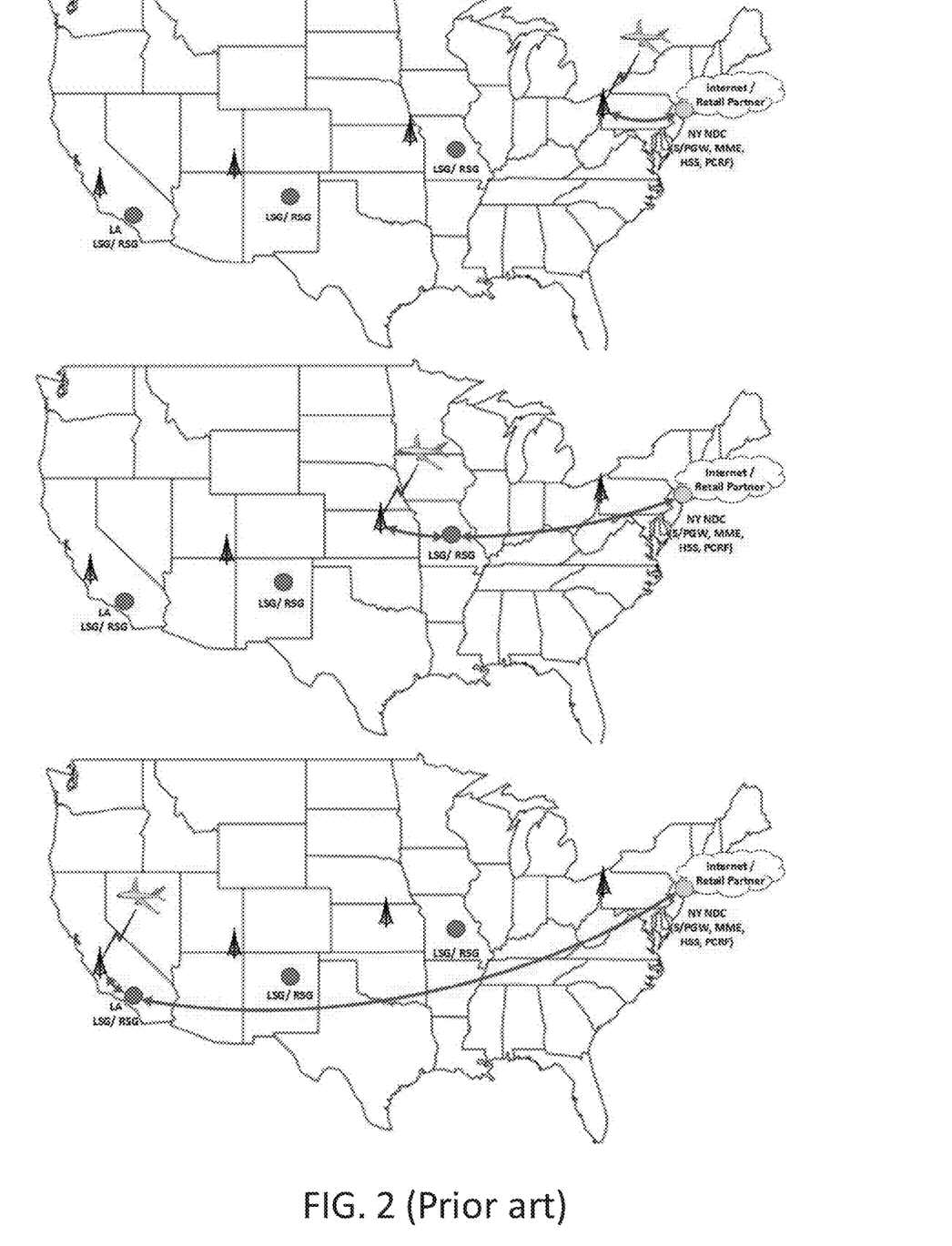
FIG. 2 illustrates an exemplary visual representation of communication channel between a traveling terminal and a "home" PGW according to the current 3GPP standards.

FIG. 2 illustrates an exemplary visual representation of communication channel between a traveling terminal and a "home" PGW according to the current 3GPP standards. Current 3GPP LTE standards do not anticipate terminals that require continuous connectivity while traveling across great geographic distances in comparatively short periods of time. Most common LTE/cellular services are designed for their mobile subscribers who, in their daily routine, are not traveling very far from the "home" PGW to which their mobile devices are attached. Terminals can move around and, from time to time, can move out of the coverage area of a particular SGW coverage and into that of another SGW (SGW re-location), but the terminal remains "homed" to the initially assigned PGW. This may result in un-optimized traffic patterns but the occurrence is comparatively small.

However, there are use cases where the user travels on a high speed train or an aircraft. An aircraft using an LTE based Air-to-Ground (ATG) network may travel many hundreds of miles in a matter of hours. While the aircraft transits the country, a user terminal will handover to successive eNBs (cell sites) based on signal strength and will from time to time be reassigned a nearer SGW. However, the terminal will remain "homed" and "anchored" to the initially assigned PGW. As the distance between the terminal and the assigned PGW increases, latency and other performance considerations also increases.

For example, in FIG. 2, a terminal on an aircraft departing from New York and destined for Los Angeles is initially attached to the nearest and best serving cell based on (among other things) the best signal strength. An SGW and PGW are assigned the terminal and data traffic is transported to that PGW to which it then becomes "homed" by means of the S5 interface.

As the aircraft travels across the country, the terminal will handover between eNBs (cell-sites) and SGWs as required. In this case, new SGWs are assigned in Missouri and New Mexico before the final SGW at Los Angeles is reached. However, the data traffic between the terminal and the Internet must go through its "homed" PGW. For each SGW re-location, the S5 tunnel is re-located in order to route the data traffic to the "home" PGW, which results in an un-optimized traffic pattern. In particular, even when the SGW is in Missouri, New Mexico and Los Angeles, data must be transported back to the PGW in New York. Accordingly, incremental round-trip latency is introduced with potential negative impact on user-experience.

Figure 3:
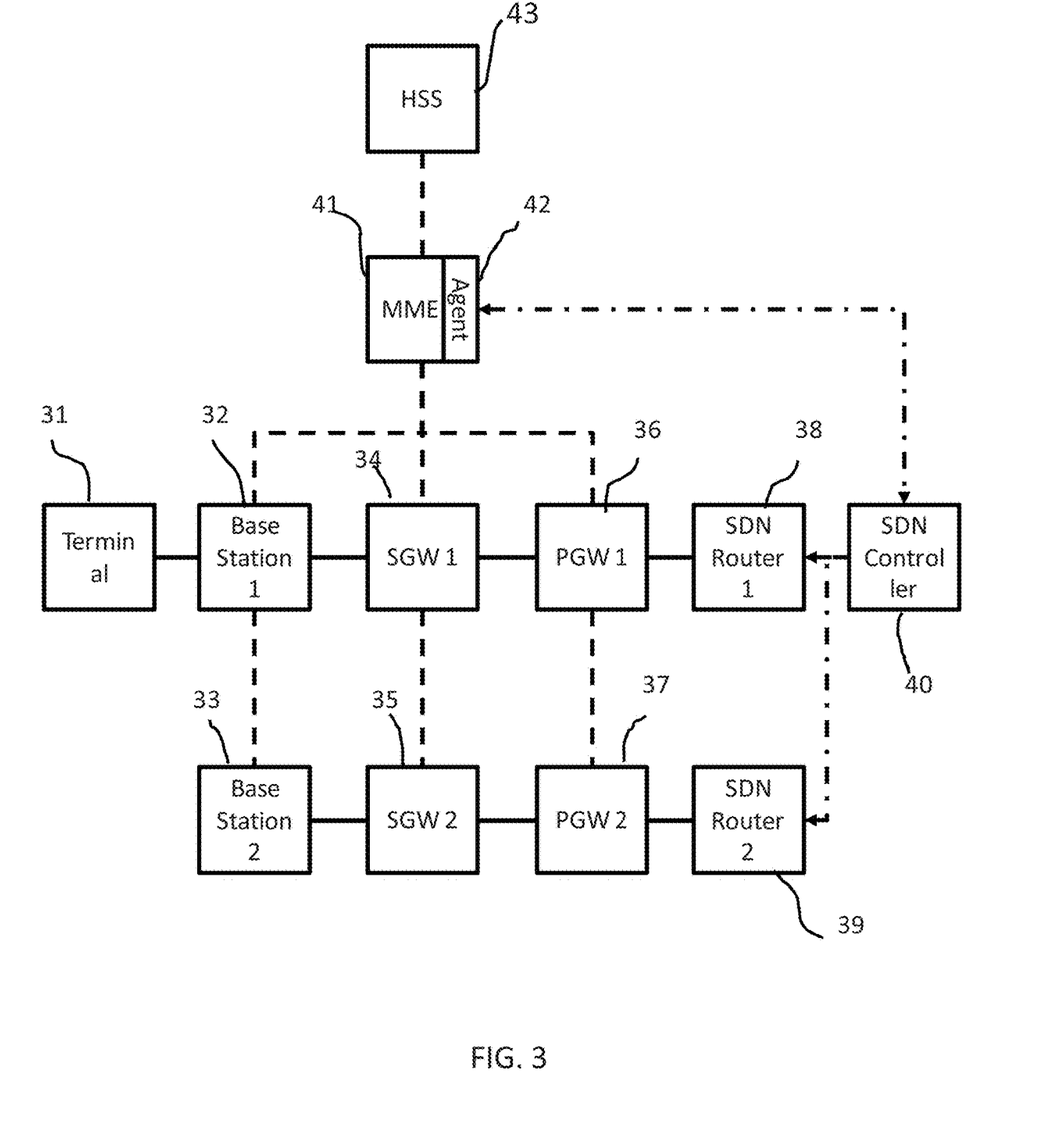
FIG. 3 illustrates an exemplary functional architecture for seamless PGW relocation according to an example embodiment.

FIG. 3 illustrates an exemplary functional architecture for seamless PGW relocation according to an example embodiment. The diagram shows that standard 3GPP EPC architecture is integrated with a SDN routing structure. Referring to FIG. 3, the architecture is capable of introducing the following improvements to the standard 3GPP EPC architecture. The Seamless PGW Relocation according to an example embodiment provides a new MME signaling method to establish a tunnel (e.g., a GPRS Tunneling Protocol (GTP) tunnel) for a connected terminal between a new SGW and a new PGW to facilitate terminal PGW attachment relocation and employs the SDN as an enabling technology that reconfigures IP network routing in response to PGW relocation of a terminal, where the same IP address is retained before and after the relocation. Accordingly, the IP address of the terminal for a user session is unchanged before and after relocation. This is a critical requirement in order for a terminal session not to be interrupted during the PGW relocation. The end result of the PGW relocation is a more optimized traffic pattern using the new PGW and end-user IP session continuity. Thus, some example embodiments may provide seamless and dynamic reassignment or relocation of the PGW of fast moving communications equipment (e.g., an aircraft or other fast platform that moves long distances) without any need to change the IP address of such equipment during one or more transitions of the PGW and SGW.

Referring to FIG. 3, in an example embodiment the capability described above can be accomplished by creating a new signaling method and adding an SDN agent onto/in the 3GPP MME 41. The new method on/in the 3GPP MME 41 is used to signal a GTP tunnel between SGW 2 and PGW 2 at the time the MME is facilitating a user terminal handover from Base Station 1 to Base Station 2, in which case the user terminal is served by Base Station 1, SGW 1, and PGW 1 at the beginning of the handover and served by Base Station 2, SGW 2, and PGW 2 at the end of handover. The MME agent 42 may be configured to communicate with a SDN controller 40 to report terminal PGW attachment relocation events and receive instruction from the SDN controller 40 to achieve the seamless and dynamic reassignment or relocation of the PGW as described herein.

Before handover from Base Station 1 to Base Station 2, the terminal 31 is served by SGW 1 and PGW 1, and a GTP tunnel for the terminal has been orchestrated by the MME 41 between SGW 1 and PGW 1. According to 3GPP TS 23.401, a S1 or X2 handover with SGW relocation will trigger the MME to orchestrate a GTP tunnel between the new SGW and existing PGW. In order to facilitate PGW relocation with UE IP address preservation, the following procedure is added to allow the MME to orchestrate a GTP tunnel between the new SGW and target relocation PGW. Here it is assumed that the MME 41 is both the source MME and the destination MME although source MME and target MME can be different according to 3GPP TS 23.401. To signal GTP between SGW 2 and PGW 2, MME 41 initiates a Create Session Request to SGW 2 with PGW 2 as the PGW S5 Address for Control Plane and the existing UE IP address as the PDN Address Allocation. In reacting to receiving the Create Session Request from the MME 41, SGW 2 initiates a Create Session Request to PGW2 with PGW 2 as the PGW S5 Address for the Control Plane and the existing UE IP address as the PDN Address Allocation. PGW 2 creates data flow for Terminal 31 and Create Session Response to SGW 2. SGW 2 will respond to MME 31 with a Create Session Response message.

An SDN capable router 38 and 39 may be either built into the PGW function or implemented separately as the "next hop" for data traffic. The SDN controller 40 or functionally similar logic may be either built into the MME function or implemented separately. When the MME and SDN controller are integrated as one component, there is an internal communication channel between the MME function and SDN controller function. When the MME and SDN controller are separate functions, the MME has an SDN agent that can communicate with SDN controller through a TCP/IP communication channel. The MME notifies the SDN controller of a PGW relocation event. The terminal IP address is included in the notification from the MME to the SDN controller. The SDN controller can dynamically configure and re-configure routing for SDN routers (as currently implemented in SDN routing architectures) to announce the current terminal attachment point in the network.

MME 41 notifies SDN controller 40 of a new PGW relocation event immediately after it orchestrates a GTP tunnel between SGW 2 and PGW 2. The SDN controller notifies the success or failure of the routing reconfiguration. If the routing reconfiguration is successful, the MME deletes the temporary GTP tunnel between SGW 1 and SGW 2 and the existing GTP tunnel between SGW 1 and PGW 1. If the routing reconfiguration fails the MME deletes the established GTP tunnel between SGW 2 and PGW 2 and temporary GTP tunnel between SGW 1 and SGW 2.

Figure 4:
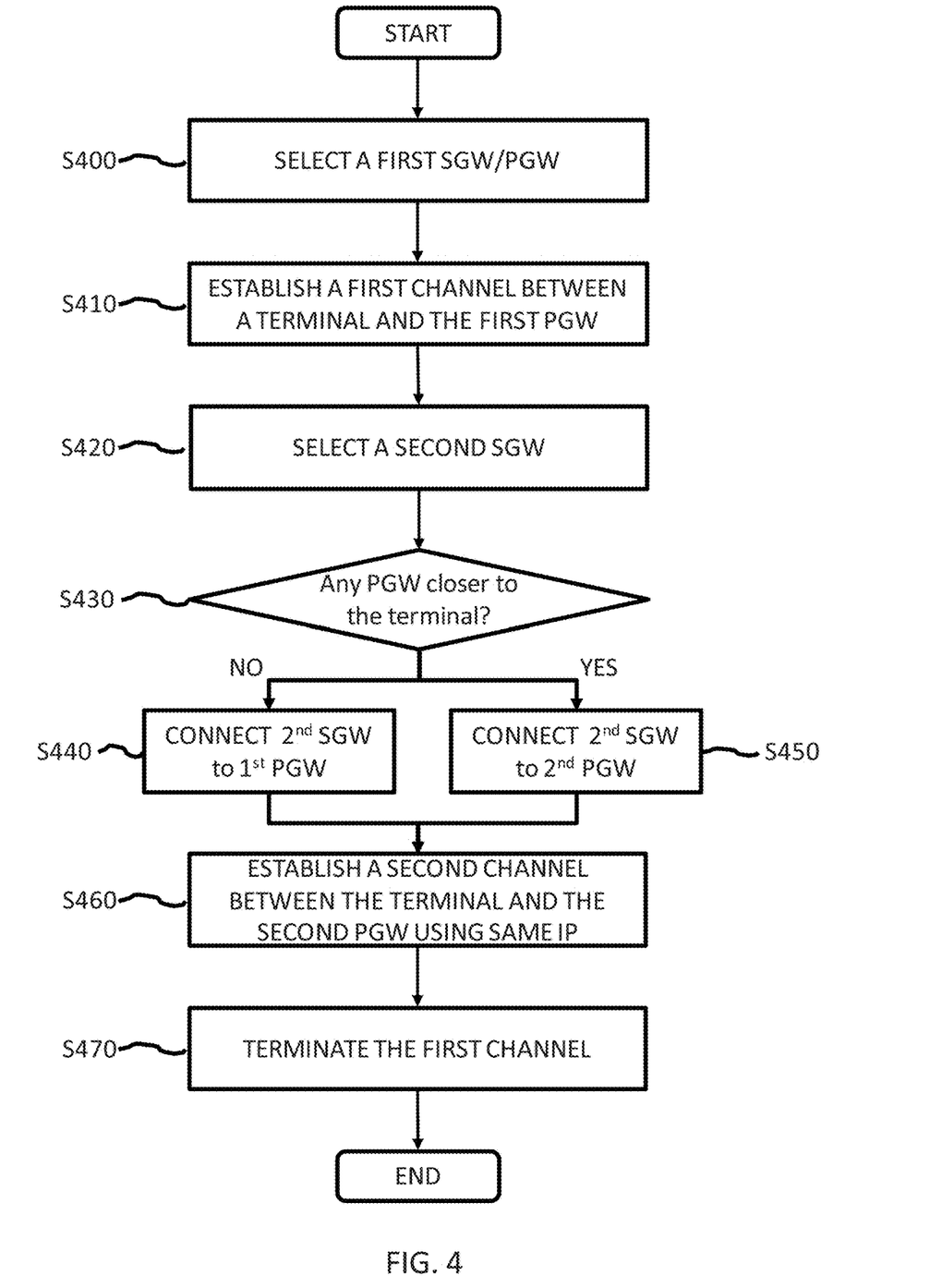
FIG. 4 is a flow chart to depict an exemplary embodiment for relocating a terminal to a different PGW while maintaining the assigned IP address according to an example embodiment.

FIG. 4 is a flow chart to depict an exemplary embodiment for relocating a terminal to a different PGW while maintaining the assigned IP address according to an example embodiment. Referring to FIG. 4, when a terminal attaches to a wireless communication network, a first SGW is selected among a plurality of SGWs and a first PGW is selected among a plurality of PGWs (S400). The first SGW is connected to the first PGW to setup the first S5 session. A first communication channel is established between the terminal and the first PGW (S410). An IP address is allocated to the terminal for the communication channel.

When the terminal is about to move out of an area that is being served by the first SGW, a second SGW is selected generally based on network topology (S420). If there is a second PGW which is closer to the second SGW (S430), then the second SGW connects to the second PGW (S450) to setup a new S5 session. If there is no closer PGW than the first PGW, the second SGW connects to the first PGW (S440) to modify the first S5 session. This PGW re-selection logic can be implemented in the MME.

Figure 5:
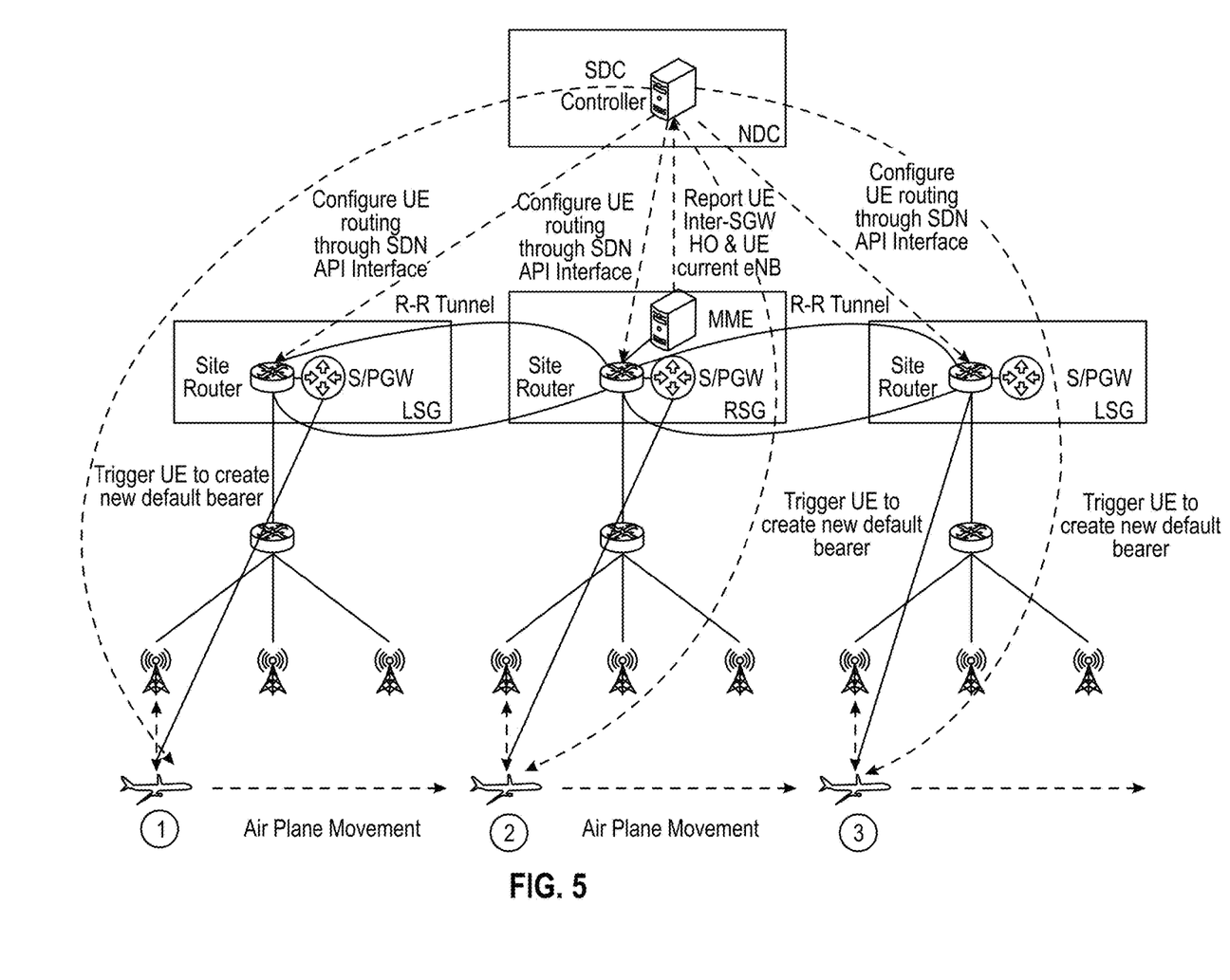
FIG. 5 illustrates an exemplary visual representation of flows of data and signals among entities of the wireless network according to an example embodiment.

FIG. 5 illustrates exemplary visual representation of flows of data and signals among entities of the wireless network according to an example embodiment. Referring to FIG. 5, there are three major execution phases in this solution; each phase depends on the result of previous phases. First, the MME orchestrates handover with PGW relocation (or other core components or network elements with the appropriate interfaces and logic) and notifies the SDN controller of a PGW relocation event, in a timely fashion, with information regarding the terminal that is involved, the IP address assigned to the terminal, and the target PGW. Second, the SDN controller instructs the SDN capable router(s) to reconfigure routing for the terminal IP address to deliver returning-to-terminal traffic to the new PGW. Third, the SDN controller notifies MME of the success of the routing reconfiguration and the MME initiates deletion of the temporary GTP established to assist the handover and the initial GTP in use before the handover.

Before the SDN controller can reconfigure IP routing to support a PGW relocation, the SDN controller must know that the relocation has occurred and have received at least the following information about the event: whether the terminal and the IP address that has been relocated and the source and destination of the PGW. The generation of this information must come from EPC domain and the MME is the logical EPC component to provide this information (or alternatively some element obtaining the required information from the EPC for use by the SDN controller or equivalent logic). Therefore, as indicated in the proposed functional architecture, an SDN agent is implemented in the MME to monitor PGW relocation events and notify the SDN controller when such an event has happened.

While the MME provides the most logical functional location to trigger a PGW relocation, the relocation logic can be implemented locally in the MME or retrieved from an external management function or orchestration entity, such as a separate SDN controller or from an external management or orchestration application at the logical layers above SDN controller.

If the PGW relocation logic is implemented in an SDN controller, the MME will query the SDN controller for the optimal PGW in relation to a given SGW and a given terminal. Once the PGW re-location decision is made by SDN controller (or other applicable logic source), it will utilize the communication channel with the SDN agent in the MME to instruct the MME to trigger a PGW relocation for all existing bearers. During the procedure, a closer PGW is selected for bearer termination and the same IP address is attached to the terminal. The completion of the migration of all bearers associated with a UE is reported back to the SDN controller by the SDN agent in the MME.

There is no single design of SDN network that can claim to fit all network scenarios. The general principle of the SDN router setup should be designed to minimize/optimize the SDN controller's effort (reduce networking complexity, latency, CPU utilization, operational risk) required to reconfigure routing to support PGW relocation. The configuration example presented here proposes all SDN routers be fully meshed with MPLS LSPs or GRE tunnels so that they can route traffic between them in a single hop. In this way, the reconfiguration of routing is only needed on these SDN routers, not on any of intermediate routers between these SDN routers.

Figure 6A:
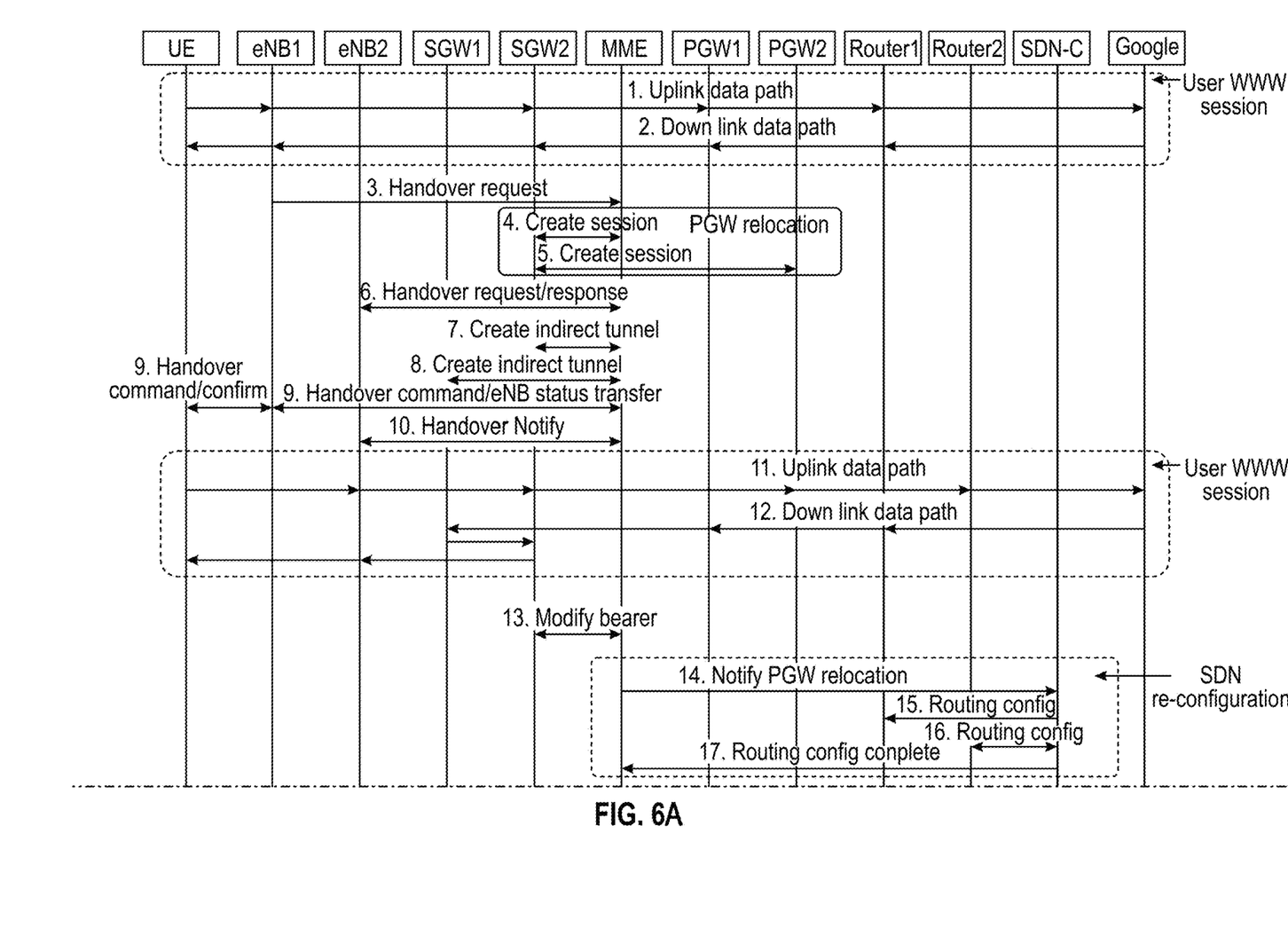
Figure 6B:
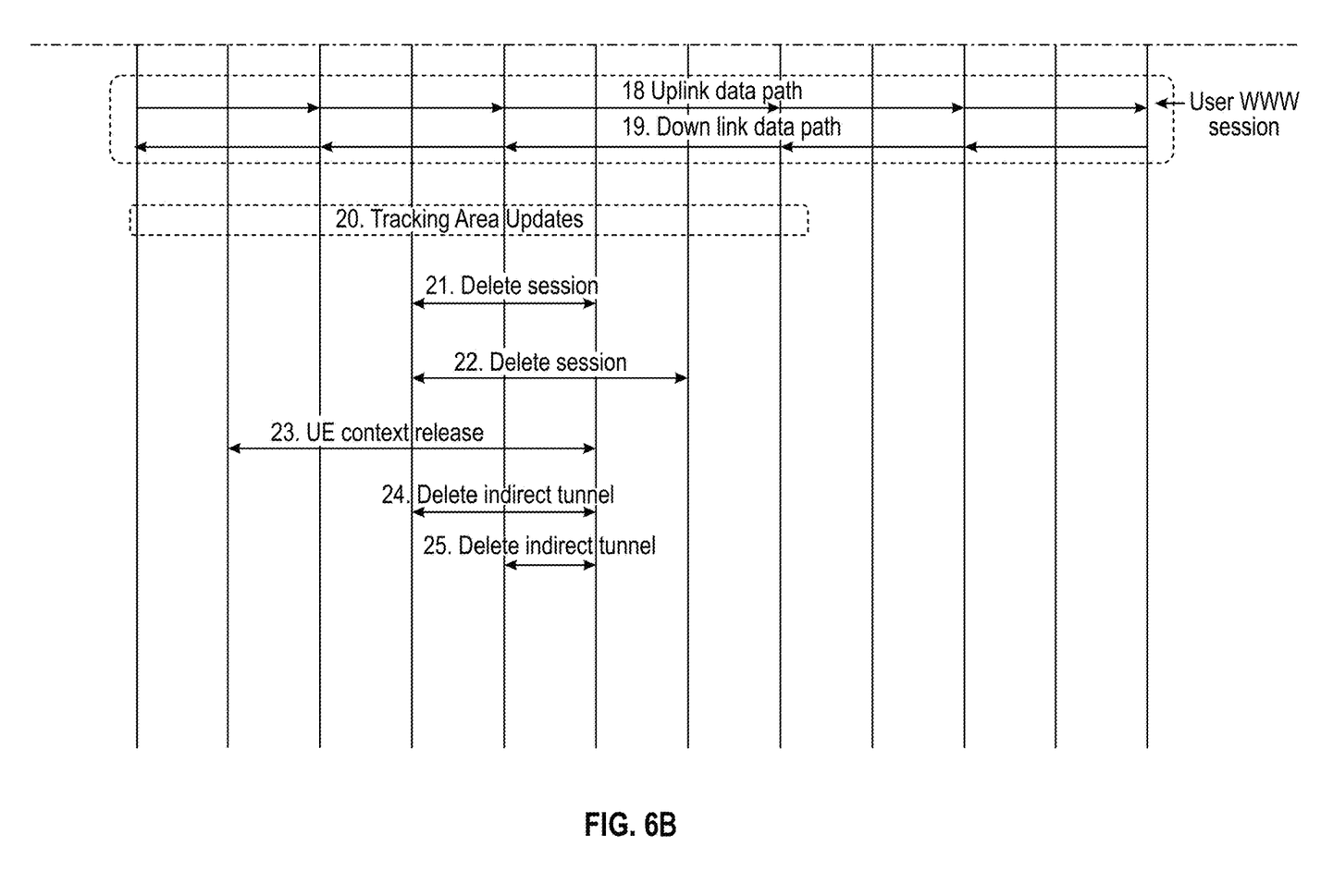

Based on the above proposed SDN router setup, the SDN controller can reconfigure routing on the SDN router(s) once it has been informed of a PGW relocation. The reconfiguration synchronizes the host route for the involved terminal on all SDN routers pointing to the specific SDN router that is directly connected to the new PGW. The net effect of the SDN controller is the real time configuration of a host route for the terminal on the SDN routers and utilizing MPLS LSP or GRE tunnels to deliver terminal traffic to the correct PGW. The Internet routers, which are announcing routes to the Internet at every PGW location, will see no change during the PGW relocation. They announce the same aggregated routes for all terminals FIG. 6 illustrates exemplary visual representation of sequences of events and data flows among the entities of the wireless network according to a seamless PGW relocation caused by a UE handover from a source eNB to a target eNB example embodiment. Referring to FIG. 6, the entities of the wireless network performs the following high level steps. In this example representation the source MME and target MME are treated as the same.

1. For each new terminal attachment request, an SGW and PGW are selected for the terminal. The PGW can be collocated with the SGW. FIG. 6 represents the existing eNB, SGW, PGW, and first hop router as eNB1, SGW1, PGW1, and Router1

2. Communication sessions between the UE and the Internet (represented as Google web site) are processed at eNB1, SGW1, PGW1, and Router1 for uplink traffic (traffic from the UE to the Internet) and at Router1, PGW1, SGW1, and eNB1 for downlink traffic (traffic from the Internet to the UE).

3. eNB1 sends an S1 handover request to the MME from eNB 1 to eNB2

4. The MME functions as both the source MME and the target MME. The MME runs gateway selection logic and determines whether or not to orchestrate S1 handover with PGW relocation with SGW2 as the target SGW and PGW2 as the target PGW. The MME signals SGW2 to create a GTP session with PGW2 with the terminal EPS bearer context.

5. SGW2 sends PGW2 a Create Session Request with terminal bearer context. SGW2 and PGW2 establish the GTP tunnel and PGW2 creates the IP flow based on the same terminal IP addresses.

6. The MME sends eNB2 a Handover Request and eNB2 replies with an MME handover response as defined in 3GPP TS 23.401.

7. The MME signals SGW2 to create an indirect tunnel for data forwarding with SGW1 as described in 3GPP TS 23.401.

8. The MME signals SGW1 to create an indirect tunnel for data forwarding with SGW2 as described in 3GPP TS 23.401.

9. The MME sends eNB 1 a Handover Commend and eNB1 sends a Terminal Handover Commend. The Terminal confirms handover to eNB1, and eNB1 notifies the MME of the handover status.

10. eNB2 starts to serve the Terminal and sends a Handover Notification to the MME.

11. At this point the handover with PGW relocation has been completed but the routing has not yet converged. The uplink user traffic will go through eNB2, SGW2, PGW2, and Router2.

12. The downlink traffic will go through Router1, PGW1, SGW1, SGW2, eNB2. The downlink traffic uses the data forwarding tunnel between SGW1 and SGW2.

13. The MME sends SGW2 a Modify Bearer Request as defined in 3GPP TS 23.401

14. The MME notifies the SDN controller of a PGW relocation event with Router1, Router2, and terminal IP address information.

15. The SDN controller performs routing reconfiguration on Router1.

16. The SDN controller performs routing reconfiguration on Router2.

17. The SDN controller notifies MME the completion of the routing reconfiguration.

18. At this point the routing for the Terminal is converged. The uplink user traffic will go through eNB2, SGW2, PGW2, and Router2.

19. The downlink user traffic will go through Router2, PGW2, SGW2, and eNB2.

20. Tracking area update.

21. The MME signals SGW1 to delete old session.

21. The MME signals eNB1 to release UE context.

23. The MME signals SGW1 to delete the indirect data forwarding tunnel.

24. The MME signals SGW2 to delete the indirect data forwarding tunnel.

Figure 7:
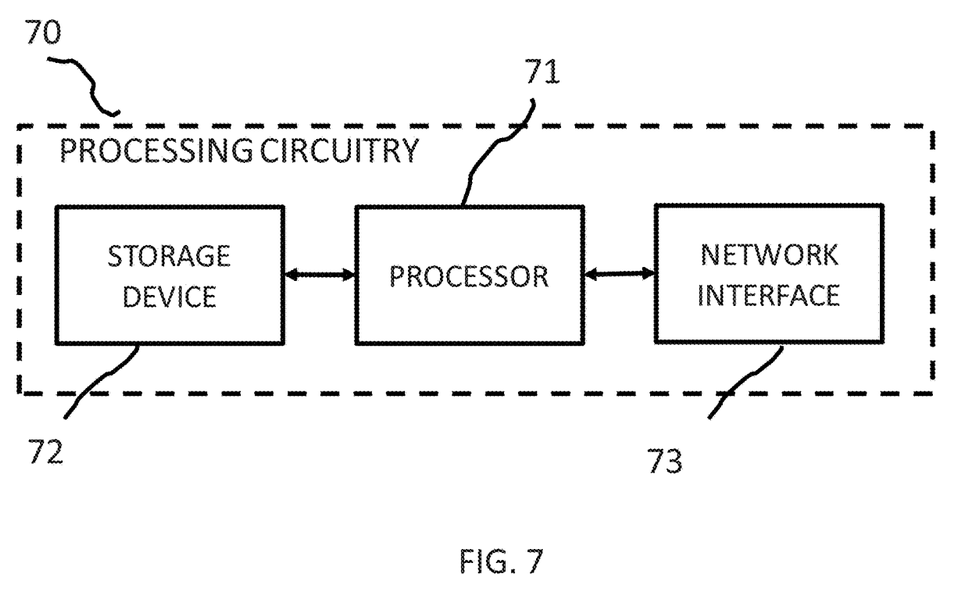
FIG. 7 illustrates a functional block diagram of an apparatus for performing seamless relocation of a mobile terminal according to an example embodiment.

FIG. 7 illustrates a functional block diagram of an apparatus for performing seamless relocation of a mobile terminal according to an example embodiment. Referring now to FIG. 7, an apparatus configured for performing seamless relocation of a mobile terminal is provided. In an example embodiment, the apparatus may perform the operations described above in reference to FIG. 6.

The apparatus may include processing circuitry 70 that is configured to perform data processing, application execution and other processing and management services according to an example embodiment of the present invention. In one embodiment, the apparatus may be a mobility management entity (MME). The processing circuitry 70 may include a processor 71, a storage device 72, and a network interface 73. As such, the processing circuitry 70 may be embodied as a circuit chip (e.g., an integrated circuit chip) configured (e.g., with hardware, software or a combination of hardware and software) to perform operations described herein. However, in some embodiments, the processing circuitry 70 may be embodied as a portion of a server, computer, laptop, workstation or even one of various mobile computing devices.

The processor 71 may be embodied in a number of different ways. For example, the processor 71 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 71 may be configured to execute instructions stored in the storage device 72 or otherwise accessible to the processor 71. As such, whether configured by hardware or software methods, or by a combination thereof, the processor 71 may represent an entity (e.g., physically embodied in circuitry) capable of performing operations according to embodiments of the present invention while configured accordingly. Thus, for example, when the processor 71 is embodied as an ASIC, FPGA or the like, the processor 71 may be specifically configured hardware for conducting the operations described herein. Alternatively, as another example, when the processor 71 is embodied as an executor of software instructions, the instructions may specifically configure the processor 71 to perform the operations described herein.

In an example embodiment, the storage device 72 may include one or more non-transitory storage or memory devices such as, for example, volatile and/or non-volatile memory that may be either fixed or removable. The storage device 72 may be configured to store information, data, applications, instructions or the like for enabling the apparatus to carry out various functions in accordance with example embodiments of the present invention. For example, the storage device 72 could be configured to buffer input data for processing by the processor 71. Additionally or alternatively, the storage device 72 could be configured to store instructions for execution by the processor 71. As yet another alternative, the storage device 72 may include one of a plurality of databases that may store a variety of files, contents or data sets. Among the contents of the storage device 72, applications may be stored for execution by the processor 71 in order to carry out the functionality associated with each respective application.

The network interface 73 may include one or more interface mechanisms for enabling communication with other devices and/or networks. In some cases, the network interface 73 may be any means such as a device or circuitry embodied in either hardware, software, or a combination of hardware and software that is configured to receive and/or transmit data from/to a network and/or any other device or module in communication with the processing circuitry 70. In this regard, the network interface 73 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the network interface 73 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A Software Defined Network (SDN) controller comprising processing circuitry configured to:
   receive a handover request at a mobility management entity (MME) from an inflight communication terminal based on relocation of the terminal from a first base station served by a first serving gateway (SGW) among a plurality of SGWs and a first packet data network gateway (PGW) among a plurality of PGWs to a second base station served by a second SGW;
   determine, at the MME, whether to conduct a handover from the first base station to the second base station along with execution of a PGW relocation from the first PGW to a second PGW based on which of the first PGW or the second PGW is closer to the inflight communication terminal; and
   direct the handover from the first base station to the second base station while maintaining an IP address assigned to the inflight communication terminal the same through the handover.

2. The SDN controller of claim 1, further comprising utilizing a communication channel between the SDN controller and an MME agent located at the MME to instruct the MME to initiate the PGW relocation.

3. The SDN controller of claim 2, wherein maintaining the IP address comprises establishing a second communication channel between the inflight communication terminal and the second PGW using the same IP address assigned to the terminal for a first communication channel between the inflight communication terminal and the first PGW.

4. The SDN controller of claim 3, wherein maintaining the IP address further comprises:
   dynamically configuring routing of content to the IP address assigned to the inflight communication terminal previously through the first PGW, when the first communication channel is established; and
   reconfiguring routing of content to the IP address assigned to the inflight communication terminal previously through the second PGW when the second communication channel is established.

5. The SDN controller of claim 1, wherein the SDN controller is operably coupled to the first PGW via a first SDN router, operably coupled to the second PGW via a second SDN router, and operably coupled to respective additional PGWs of the plurality of PGWs by corresponding SDN routers.

6. The SDN controller of claim 5, wherein the SDN controller is configured to, based on initiation of the PGW relocation, reconfigure routing to the second SDN router by synchronizing routing for the inflight communication terminal from all SDN routers to the second SDN router.

7. The SDN controller of claim 6, wherein the SDN controller performs real time synchronization of a host route to the inflight communication terminal from the all SDN routers to the second SDN router, which is directly connected to the second PGW.

8. The SDN controller of claim 3, wherein the SDN controller is configured to direct migration of a default bearer attached to the first communication channel when the first communication channel is established between the inflight communication terminal and the first PGW to a default bearer of the second communication channel when the second communication channel is established between the inflight communication terminal and the second PGW.

9. The SDN controller of claim 3, wherein the SDN controller is configured to migrate a dedicated bearer attached to the first communication channel between the inflight communication terminal and the first PGW to the second communication channel between the inflight communication terminal and the second PGW when an additional service is required to satisfy a quality of service (QOS) requirement.

10. The SDN controller of claim 1, further comprising converging routing for the inflight communication terminal via the second PGW by transitioning from uplink routing through the second PGW and downlink routing through the first PGW to both the uplink routing and the downlink routing being through the second PGW.

11. A method for performing a hand-over of a terminal in a wireless environment, the method comprising:
receiving a handover request at a mobility management entity (MME) from an inflight communication terminal based on relocation of the terminal from a first base station served by a first serving gateway (SGW) among a plurality of SGWs and a first packet data network gateway (PGW) among a plurality of PGWs to a second base station served by a second SGW;
determining, at the MME, whether to conduct a handover from the first base station to the second base station along with execution of a PGW relocation from the first PGW to a second PGW based on which of the first PGW or the second PGW is closer to the inflight communication terminal; and
directing the handover from the first base station to the second base station while maintaining an IP address assigned to the inflight communication terminal the same through the handover.

12. The method of claim 11, further comprising utilizing a communication channel between the SDN controller and an MME agent located at the MME to instruct the MME to initiate the PGW relocation.

13. The method of claim 12, wherein maintaining the IP address comprises establishing a second communication channel between the inflight communication terminal and the second PGW using the same IP address assigned to the terminal for a first communication channel between the inflight communication terminal and the first PGW.

14. The method of claim 13, wherein maintaining the IP address further comprises:
dynamically configuring routing of content to the IP address assigned to the inflight communication terminal previously through the first PGW, when the first communication channel is established; and
reconfiguring routing of content to the IP address assigned to the inflight communication terminal previously through the second PGW when the second communication channel is established.

15. The method of claim 11, wherein the SDN controller is operably coupled to the first PGW via a first SDN router, operably coupled to the second PGW via a second SDN router, and operably coupled to respective additional PGWs of the plurality of PGWs by corresponding SDN routers.

16. The method of claim 15, wherein the SDN controller is configured to, based on initiation of the PGW relocation, reconfigure routing to the second SDN router by synchronizing routing for the inflight communication terminal from all SDN routers to the second SDN router.

17. The method of claim 16, wherein the SDN controller performs real time synchronization of a host route to the inflight communication terminal from the all SDN routers to the second SDN router, which is directly connected to the second PGW.

18. The method of claim 13, further comprising:
migrating a default bearer attached to the first communication channel when the first communication channel is established between the inflight communication terminal and the first PGW to a default bearer of the second communication channel when the second communication channel is established between the inflight communication terminal and the second PGW.

19. The method of claim 13, further comprising:
migrating a dedicated bearer attached to the first communication channel between the inflight communication terminal and the first PGW to the second communication channel between the inflight communication terminal and the second PGW when an additional service is required to satisfy a quality of service (QOS) requirement.

20. The method of claim 11, further comprising converging routing for the inflight communication terminal via the second PGW by transitioning from uplink routing through the second PGW and downlink routing through the first PGW to both the uplink routing and the downlink routing being through the second PGW.

* * * * *